United States Patent
Hulick, Jr.

(10) Patent No.: US 11,256,590 B1
(45) Date of Patent: Feb. 22, 2022

(54) AGENT PROFILER TO MONITOR ACTIVITIES AND PERFORMANCE OF SOFTWARE AGENTS

(71) Applicant: Cisco Technology, Inc., San Jose, CA (US)

(72) Inventor: Walter Theodore Hulick, Jr., Pearland, TX (US)

(73) Assignee: Cisco Technology, Inc., San Jose, CA (US)

( * ) Notice: Subject to any disclaimer, the term of this patent is extended or adjusted under 35 U.S.C. 154(b) by 237 days.

(21) Appl. No.: 16/585,113

(22) Filed: Sep. 27, 2019

Related U.S. Application Data

(60) Provisional application No. 62/741,890, filed on Oct. 5, 2018.

(51) Int. Cl.
| | |
|---|---|
| *G06F 9/445* | (2018.01) |
| *G06F 9/455* | (2018.01) |
| *G06F 11/30* | (2006.01) |
| *G06F 11/32* | (2006.01) |
| *G06F 11/34* | (2006.01) |

(52) U.S. Cl.
CPC ........ *G06F 11/302* (2013.01); *G06F 9/44505* (2013.01); *G06F 9/45504* (2013.01); *G06F 11/3466* (2013.01)

(58) Field of Classification Search
CPC .............. G06F 11/302; G06F 9/44505; G06F 9/45504; G06F 11/3466
USPC ......................................................... 702/186
See application file for complete search history.

(56) References Cited

U.S. PATENT DOCUMENTS

| | | | |
|---|---|---|---|
| 7,086,064 B1 | 8/2006 | Stevens | |
| 7,506,317 B2 | 3/2009 | Liang et al. | |
| 9,727,436 B2 | 8/2017 | Mostafa | |
| 9,836,320 B2 | 12/2017 | Williams | |
| 10,007,509 B1 * | 6/2018 | Qureshi | G06F 8/65 |

(Continued)

OTHER PUBLICATIONS

"Interface Instrumentation", java.lang.instrument, https://docs.oracle.com/javase/7/docs/api/java/lang/instrument/Instrumentation.html, 6 pages, 2018, Oracle.

(Continued)

*Primary Examiner* — John H Le
(74) *Attorney, Agent, or Firm* — Behmke Innovation Group LLC; James M. Behmke; James J. Wong

(57) ABSTRACT

In one embodiment, a software agent profiler process attaches to an application and a primary instrumentation interface for the application, and discovers one or more software agents associated with the application. The software agent profiler process may then launch the one or more software agents within an encapsulated container environment of the software agent profiler process by configuring each of the one or more software agents, respectively, to point to a proxy instrumentation interface of the software agent profiler process instead of the primary instrumentation interface for the application. As such, the software agent profiler process may receive calls from the one or more software agents on the proxy instrumentation interface of the software agent profiler process, and can manage the calls from the one or more application agents prior to the calls being passed to the primary instrumentation interface for the application.

20 Claims, 19 Drawing Sheets

(56) References Cited

U.S. PATENT DOCUMENTS 11,055,273 B1 * 7/2021 Meduri ................ G06F 16/219
2017/0177272 A1 6/2017 Ilangovan et al.

OTHER PUBLICATIONS

Horký, et al., "Analysis of Overhead in Dynamic Java Performance Monitoring", ICPE'16, Mar. 12-18, 2016, Delft, Netherlands, pp. 275-286, 2016, ACM.
Salnikov-Tarnovski, Nikita., "Lies, damn lies and our performance overhead is 2%", https://plumbr.io/blog/java/lies-damn-lies-and-our-performance-overhead-is-2, 3 pages, Jun. 13, 2017., plumbr.io.

* cited by examiner

710

```
-javaagent:$PATH/javaagent.jar
-Example.agent.accountName=customer1_051cb
-Example.agent.accountAccessKey=SJ5b2....
-Example.controller.hostName=localhost
-Example.controller.port=8080
-Example.agent.applicationName=TestApp Name
-Example.agent.uniqueHostId=TestAppHost
-Example.agent.tierName=TestAppTier
-Example.agent.nodeName=TestAppNodeName
```

-javaagent:(INSTALLED)/javaagent.jar
installed: javaagent
name: Example-Test
params:
loaded: true
properties: -exampleagent.install.dir=(INSTALLED)
 -Example.agent.accountName=customer1_051cb
 -Example.agent.accountAccessKey=SJ5b2....
 -Example.controller.hostName=localhost
 -Example.controller.port=8080
 -Example.agent.applicationName=AgentProfiler Name
 -Example.agent.uniqueHostId=AgentProfilerHost
 -Example.agent.tierName=AgentProfilerTier
 -Example.agent.nodeName=AgentProfilerNodeName
addbootjar:
addpackages: com.example
active: true getloaded-classes: true
redefine-classes: true
transform-classes: true
modify-classes: true
retransform-classes: true
```

FIG. 7B

| AGENT PROFILER STATS 800 | |
|---|---|
| METRIC 810 | VALUE 820 |
| ActivityEvents | 24 |
| CPUTimeEnabled | Yes |
| Current Loaded Classes | 9772 |
| Current Threads | 21 |
| LockConnectionEnabled | true |
| Peak Threads | 21 |
| Redefines | 0 |
| Redefined Classes | 0 |
| ... | ... |
| Retransforms | 2 |
| Retransformed Classes | 2 |
| Started Threads | 25 |
| Startup Time | Tue Oct 02 16:28:48 CDT 2008 |

FIG. 8

THREADS 900

| NAME 910 | ID 920 | STATE 930 | CPU(max) 940 | COUNTERS 950 | TIMERS 960 | LOCATION 970 |
|---|---|---|---|---|---|---|
| Thread A | 29 | TIMED_WAITING | 227 | 2368 | 312041 | Location W |
| Thread B | 30 | WAITING | 229 | 1906 | 342040 | Location X |
| Thread C | 31 | WAITING | 8 | 41 | 342210 | Location Y |
| Thread D | 32 | TIMED_WAITING | 8 | 55 | 342961 | Location Z |

FIG. 9

| THREAD 1010 | ID 1020 | STATE 1030 | OWNED LOCK 1040 | THREADS WAITING 1050 |
| --- | --- | --- | --- | --- |
| Thread 1 | 1 | BLOCKING | Lock 1<br>Lock 2 | Thread 4<br>Thread 5 |
| Thread 2 | 2 | BLOCKING | Lock 3 | Thread 6<br>Thread 7<br>Thread 8 |
| Thread 3 | 3 | TIMED_WAITING | Lock 4 | Thread 9 |
| Thread N | N | WAITING | Null | Null |

FIG. 10

| THREAD 1110 | ID 1120 | STATE 1130 | LOCK NAME 1140 | METRICS 1150 |
|---|---|---|---|---|
| Thread 4 | 4 | WAITING | Lock 1<br>Lock 2 | (metrics) |
| Thread 5 | 5 | WAITING | Lock 1<br>Lock 2 | (metrics) |
| Thread 6 | 6 | WAITING | Lock 3 | (metrics) |
| Thread N | N | RUNNABLE | Null | (metrics) |

FIG. 11

INSTRUMENTED CLASSES 1200

| Last Instrumented 1210 | Times Instrumented 1220 | Agents Modifying 1230 | Class 1240 | Loader 1250 | Old Bytes Size 1260 | New Bytes Size 1270 | Changes 1280 |
|---|---|---|---|---|---|---|---|
| Mon Sep 03 15:04:44 CDT 2018 | 1 | Example- Test | java.lang. Application ShutdownHooks | Boot | 1952 | 2394 | Class constant pool was modified, new Class has 15 additions... Class java.lang.Application ShutdownHooks has Method (code) static void runHooks() modified from 97 to 112 bytes (Instrumentation was added) |
| Mon Sep 03 15:04:44 CDT 2018 | 1 | Example- Test | java.util. concurrent. ThreadPool Executor | Boot | 16095 | 17926 | Class constant pool was modified, new Class has 16 additions... Class java.util.concurrent.Thread PoolExecutor has Method (code) protected void afterExecute (Runnable arg1, Throwable arg2) modified from 1 to 33 bytes (Instrumentation was added) Class java.util.concurrent.Thread PoolExecutor has Method (code) public String toString() modified from 218 to 216 bytes (Instrumentation was removed) |

FIG. 12

RETRANSFORMED CLASSES 1300

| CLASS 1310 | LOADER 1320 | TIMES 1330 |
|---|---|---|
| example.security.ExampleProvider | BootLoader | 1 |
| example.security.ExampleProvider$1 | BootLoader | 1 |
| org.jcp.xml.dsig.internal.dom.XMLDSigR1$1 | BootLoader | 1 |
| java.lang.ApplicationShutdownHooks | BootLoader | 1 |
| agent.JavaAgent.MBean | BootLoader | 1 |
| ceg.jcp.xml.dsig.internal.dom.XMLDSigR1 | BootLoader | 1 |
| java.util.concurrent.ThreadPoolExecutor | BootLoader | 1 |

FIG. 13

STACK SAMPLER STATISTICS 1400

| THREADS 1410 | ID 1420 | STATE 1430 | SAMPLES 1440 | ACTIVE 1450 | CPU(MAX) 1460 | WAIT TIME 1470 | LAST TRACE 1480 |
|---|---|---|---|---|---|---|---|
| Thread AB | 29 | TIMED_WAITING | 2418 | 5 | 14 | 100500 | Trace WW |
| Thread CD | 31 | WAITING | 2418 | 29 | 17 | 103807 | Trace XX |
| Thread EF | 32 | TIMED_WAITING | 2418 | 29 | 26 | 100093 | Trace YY |
| Thread GH | 30 | WAITING | 2418 | 732 | 629 | 102442 | Trace ZZ |

FIG. 14

SAMPLER HOTSPOTS 1500

| LOCATION 1510 | SAMPLE 1520 | ACTIVITY 1530 | CPU(MAX) 1540 | LAST THREAD 1550 | LAST TRACE 1560 |
|---|---|---|---|---|---|
| Location 1 | 1 | True | 30 | Thread A | Trace X |
| Location 2 | 1 | True | 25 | Thread B | Trace Y |
| Location 3 | 1 | True | 20 | Thread C | Trace Z |

FIG. 15

AGENT PROFILER TO MONITOR ACTIVITIES AND PERFORMANCE OF SOFTWARE AGENTS

RELATED APPLICATION

This application claims priority to U.S. Provisional Application No. 62/741,890, filed Oct. 5, 2018, entitled AGENT PROFILER TO MONITOR ACTIVITIES AND PERFORMANCE OF SOFTWARE AGENTS, by Walter Theodore Hulick, Jr., the contents of which are incorporated herein by reference.

TECHNICAL FIELD

The present disclosure relates generally to computer systems, and, more particularly, to an agent profiler to monitor activities and performance of software agents.

BACKGROUND

Due to the complexity of software systems, it is becoming increasingly difficult to maintain the highest level of service performance and user experience. Many software tools, including performance monitoring systems, make use of software agents, such as Java Agents, to provide instrumentation capabilities to an application.

However, there are currently no mechanisms to measure the resource overhead of software agents, or the actions of the agents, or identifying potential conflicts between multiple agents.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 7A-7B illustrate an example of an agent profiler switch in accordance with one or more embodiments described herein;

FIG. 8 illustrates an example of agent profiler statistics in accordance with one or more embodiments described herein;

FIG. 9 illustrates an example table of agent threads and associated information in accordance with one or more embodiments described herein;

FIG. 10 illustrates an example table of threads owning locks and threads waiting on those locks in accordance with one or more embodiments described herein;

FIG. 11 illustrates an example table of all threads waiting on particular locks in accordance with one or more embodiments described herein;

FIG. 12 illustrates an example table of classes instrumented by managed agents in accordance with one or more embodiments described herein;

FIG. 13 illustrates an example table showing retransformed classes in accordance with one or more embodiments described herein;

FIG. 14 illustrates an example table of sampled stack statistics from a stack sampler in accordance with one or more embodiments described herein;

FIG. 15 illustrates an example table showing sampler "hotspots" in accordance with one or more embodiments described herein.

DESCRIPTION OF EXAMPLE EMBODIMENTS

Overview

Figure 1A:
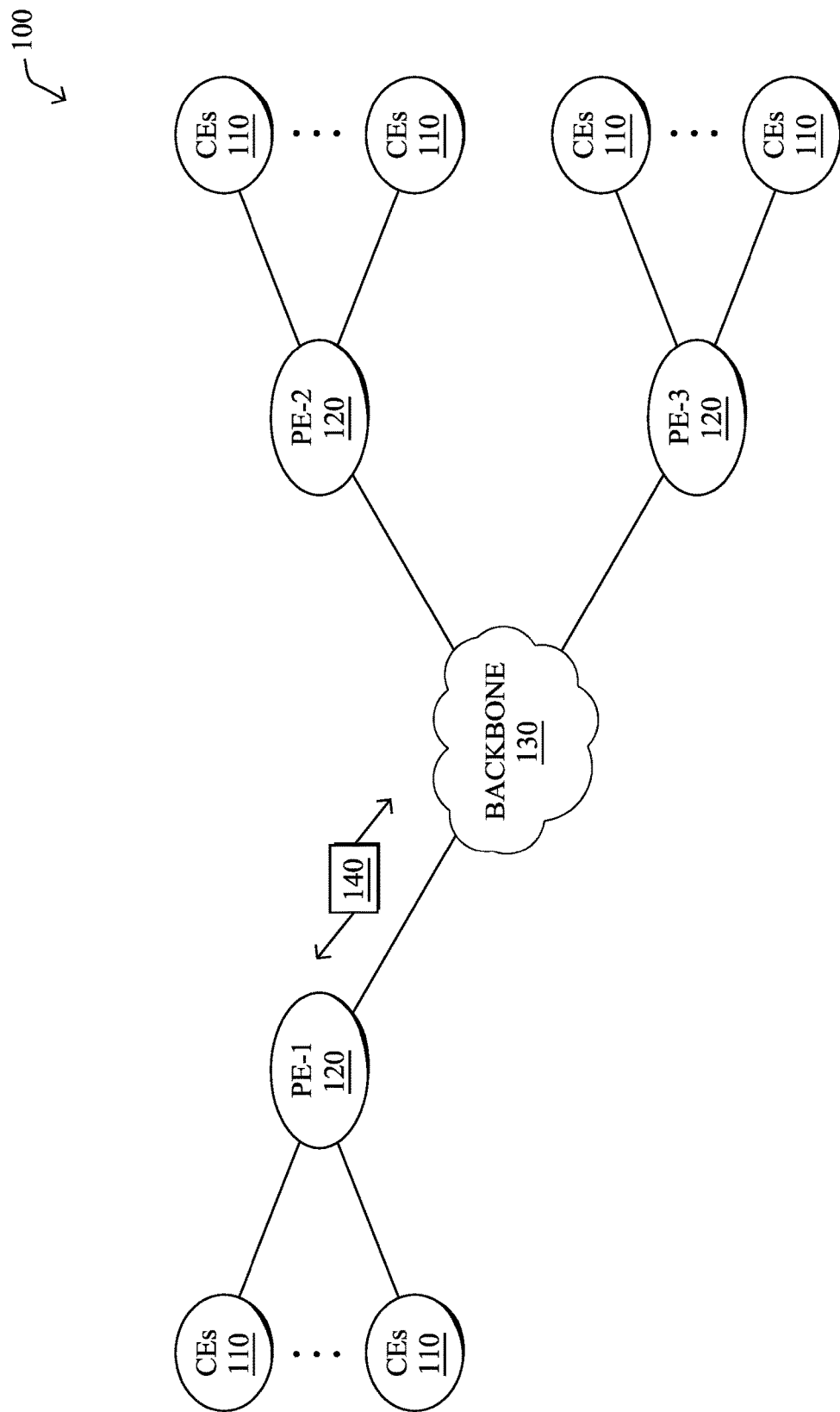
FIGS. 1A-1B illustrate an example computer network.

According to one or more embodiments of the disclosure, a software agent profiler process attaches to an application and a primary instrumentation interface for the application, and discovers one or more software agents associated with the application. The software agent profiler process may then launch the one or more software agents within an encapsulated container environment of the software agent profiler process by configuring each of the one or more software agents, respectively, to point to a proxy instrumentation interface of the software agent profiler process instead of the primary instrumentation interface for the application. As such, the software agent profiler process may receive calls from the one or more software agents on the proxy instrumentation interface of the software agent profiler process, and can manage the calls from the one or more application agents prior to the calls being passed to the primary instrumentation interface for the application.

Other embodiments are described below, and this overview is not meant to limit the scope of the present disclosure.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network.

The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or power-line communication networks. That is, in addition to one or more sensors, each sensor device (node) in a sensor network may generally be equipped with a radio transceiver or other communication port, a microcontroller, and an energy source, such as a battery. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics.

Figure 1B:
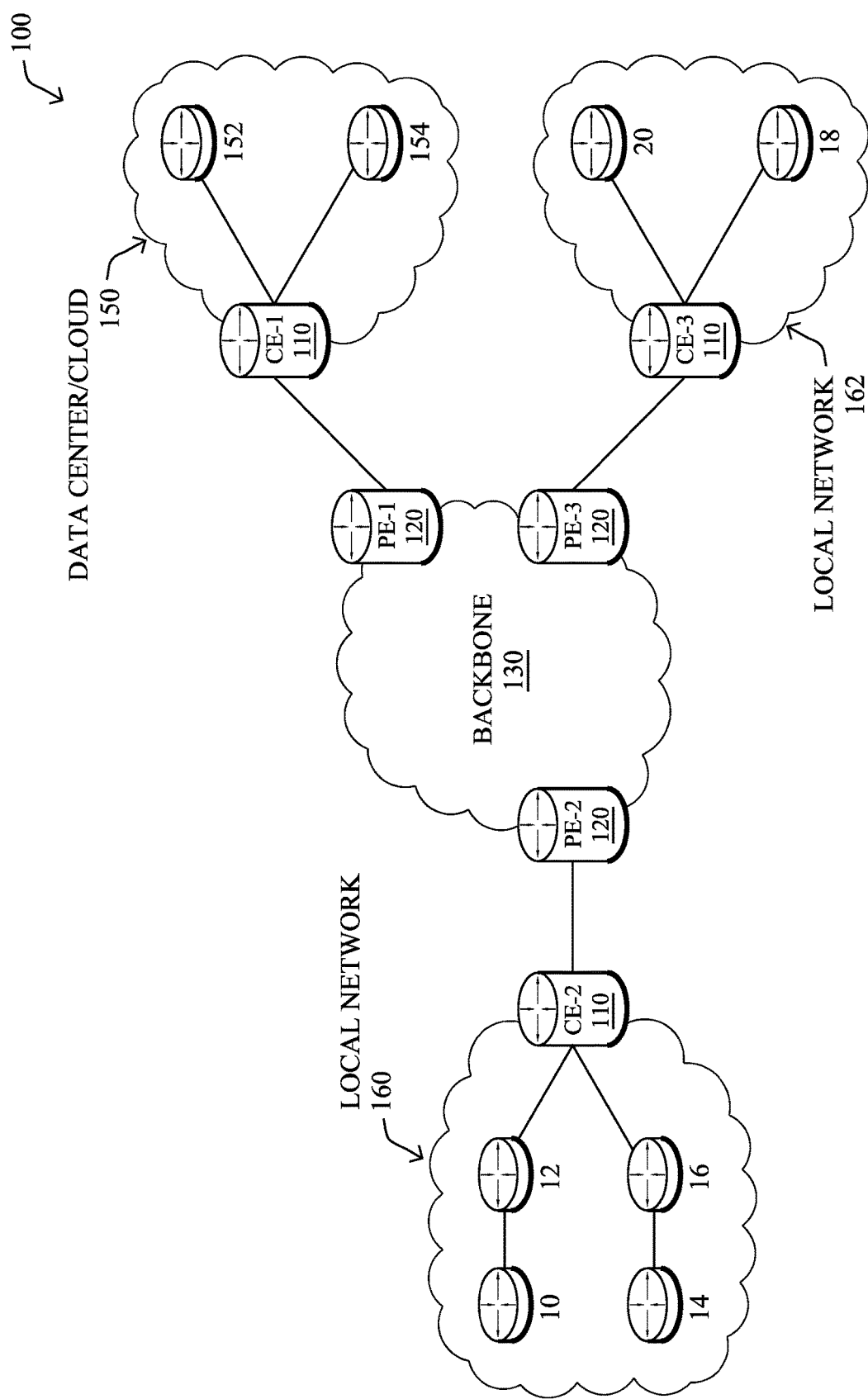

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations. Servers 152-154 may include, in various embodiments, any number of suitable servers or other cloud-based resources. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc. Furthermore, in various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
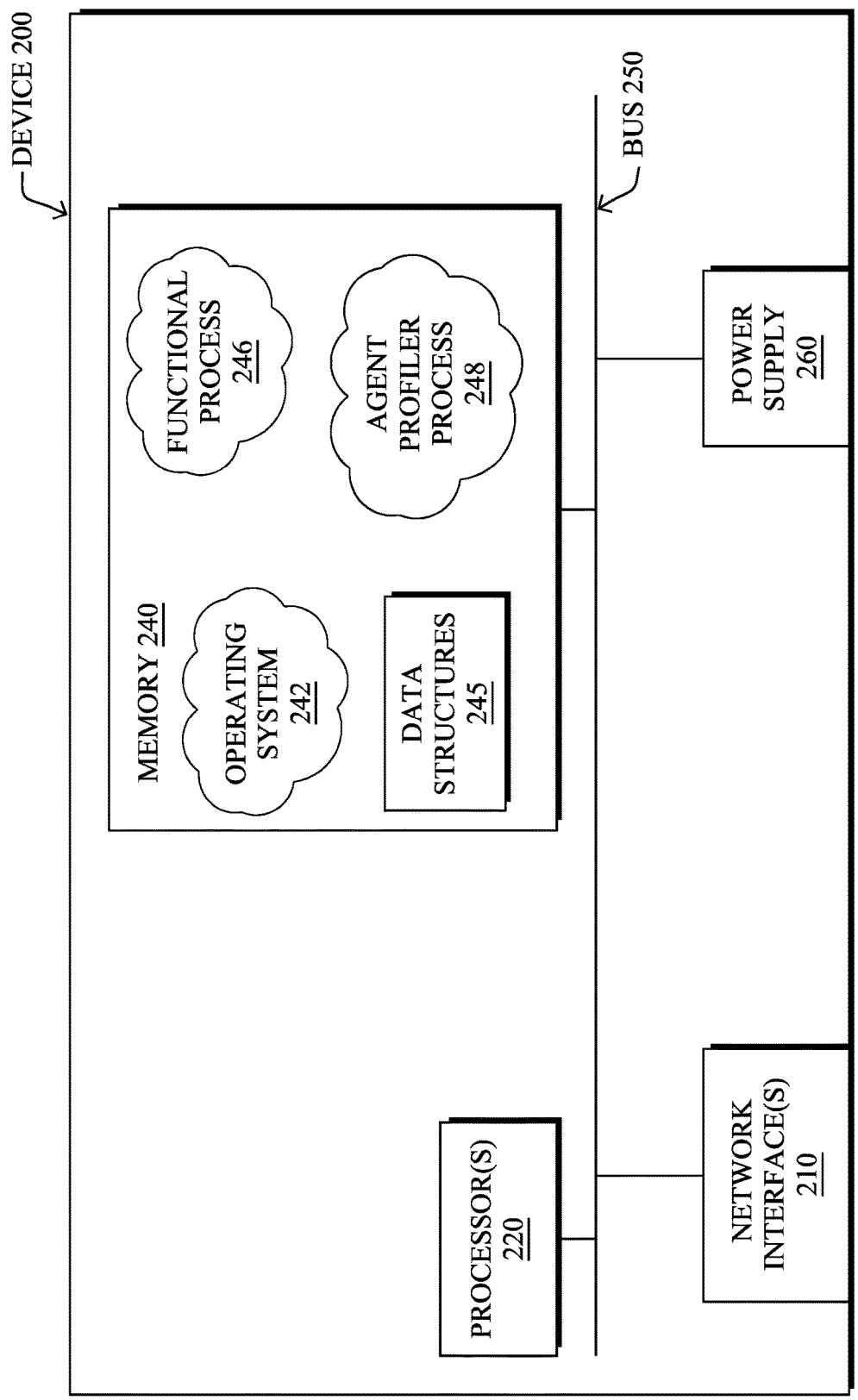
FIG. 2 illustrates an example computing device/node.

FIG. 2 is a schematic block diagram of an example computing device (e.g., apparatus) 200 that may be used with one or more embodiments described herein, e.g., as any of the devices shown in FIGS. 1A-1B above, and particularly as specific devices as described further below. The device may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100, e.g., providing a data connection between device 200 and the data network, such as the Internet. The network interfaces may be configured to transmit and/or receive data using a variety of different communication protocols. For example, interfaces 210 may include wired transceivers, wireless transceivers, cellular transceivers, or the like, each to allow device 200 to communicate information to and from a remote computing device or server over an appropriate network. The same network interfaces 210 also allow communities of multiple devices 200 to interconnect among themselves, either peer-to-peer, or up and down a hierarchy. Note, further, that the nodes may have two different types of network connections 210, e.g., wireless and wired/physical connections, and that the view herein is merely for illustration. Also, while the network interface 210 is shown separately from power supply 260, for devices using powerline communication (PLC) or Power over Ethernet (PoE), the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise one or more functional processes 246, and on certain devices, an illustrative "web application security communication" process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Application Intelligence Platform

The embodiments herein relate to an application intelligence platform for application performance management. In one aspect, as discussed with respect to FIGS. 3-5 below, performance within a networking environment may be monitored, specifically by monitoring applications and entities (e.g., transactions, tiers, nodes, and machines) in the networking environment using agents installed at individual machines at the entities. As an example, applications may be configured to run on one or more machines (e.g., a customer will typically run one or more nodes on a machine, where an application consists of one or more tiers, and a tier consists of one or more nodes). The agents collect data associated with the applications of interest and associated nodes and machines where the applications are being operated. Examples of the collected data may include performance data (e.g., metrics, metadata, etc.) and topology data (e.g., indicating relationship information). The agent-collected data may then be provided to one or more servers or controllers to analyze the data.

Figure 3:
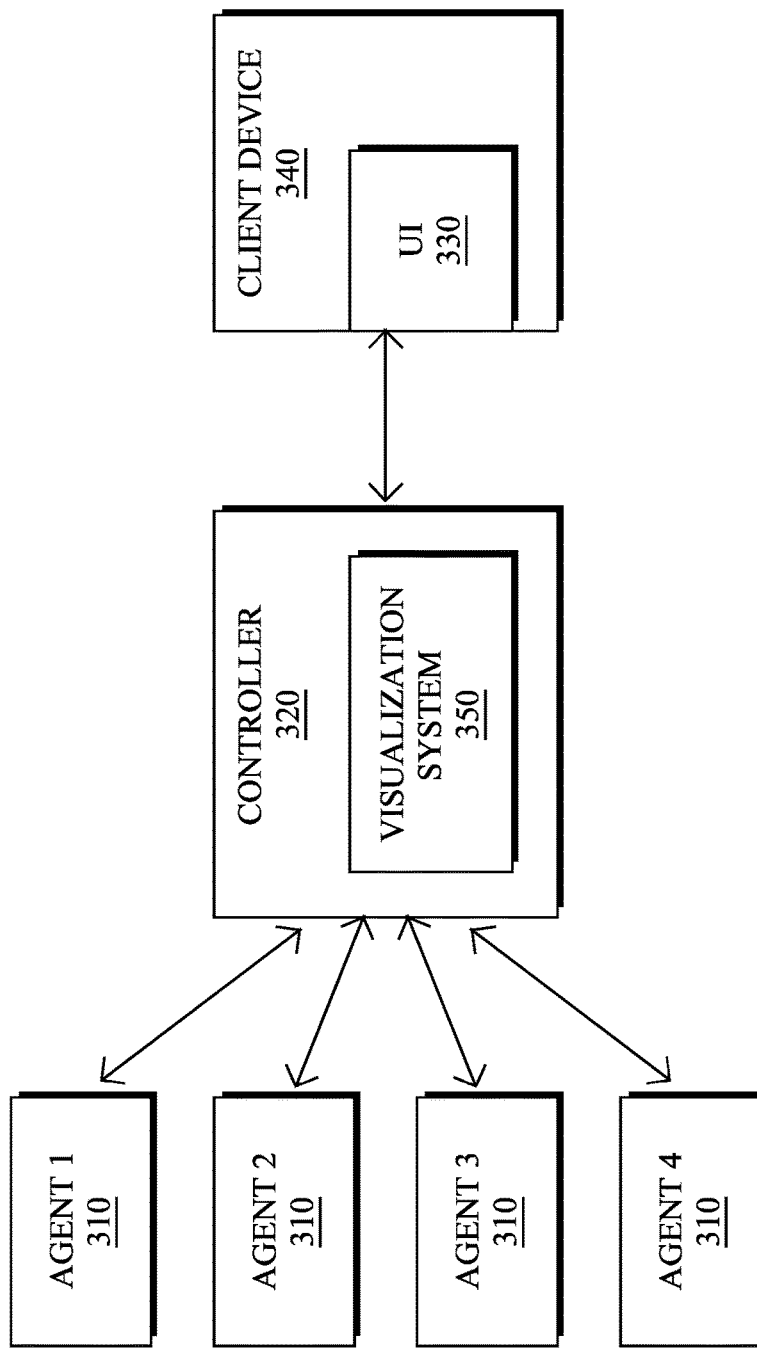
FIG. 3 illustrates an example application intelligence platform.

FIG. 3 is a block diagram of an example application intelligence platform 300 that can implement one or more aspects of the techniques herein. The application intelligence platform is a system that monitors and collects metrics of performance data for an application environment being monitored. At the simplest structure, the application intelligence platform includes one or more agents 310 and one or more servers/controllers 320. Note that while FIG. 3 shows four agents (e.g., Agent 1 through Agent 4) communicatively linked to a single controller, the total number of agents and controllers can vary based on a number of factors including the number of applications monitored, how distributed the application environment is, the level of monitoring desired, the level of user experience desired, and so on.

The controller 320 is the central processing and administration server for the application intelligence platform. The controller 320 serves a browser-based user interface (UI) 330 that is the primary interface for monitoring, analyzing, and troubleshooting the monitored environment. The controller 320 can control and manage monitoring of business transactions (described below) distributed over application servers. Specifically, the controller 320 can receive runtime data from agents 310 (and/or other coordinator devices), associate portions of business transaction data, communicate with agents to configure collection of runtime data, and provide performance data and reporting through the interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, a controller instance 320 may be hosted remotely by a provider of the application intelligence platform 300. In an illustrative on-premises (On-Prem) implementation, a controller instance 320 may be installed locally and self-administered.

The controllers 320 receive data from different agents 310 (e.g., Agents 1-4) deployed to monitor applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Database agents query the monitored databases in order to collect metrics and pass those metrics along for display in a metric browser (e.g., for database monitoring and analysis within databases pages of the controller's UI 330). Multiple database agents can report to the same controller. Additional database agents can be implemented as backup database agents to take over for the primary database agents during a failure or planned machine downtime. The additional database agents can run on the same machine as the primary agents or on different machines. A database agent can be deployed in each distinct network of the monitored environment. Multiple database agents can run under different user accounts on the same machine.

Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. A standalone machine agent has an extensible architecture (e.g., designed to accommodate changes).

End user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs. Notably, browser agents (e.g., agents 310) can include Reporters that report monitored data to the controller.

Monitoring through browser agents and mobile agents are generally unlike monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases.

A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Application Intelligence Monitoring: The disclosed technology can provide application intelligence data by monitoring an application environment that includes various services such as web applications served from an application server (e.g., Java virtual machine (JVM), Internet Information Services (IIS), Hypertext Preprocessor (PHP) Web server, etc.), databases or other data stores, and remote services such as message queues and caches. The services in the application environment can interact in various ways to provide a set of cohesive user interactions with the application, such as a set of user services applicable to end user customers.

Application Intelligence Modeling: Entities in the application environment (such as the JBoss service, MQSeries modules, and databases) and the services provided by the entities (such as a login transaction, service or product search, or purchase transaction) may be mapped to an application intelligence model. In the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

Business Transactions: A business transaction representation of the particular service provided by the monitored environment provides a view on performance data in the context of the various tiers that participate in processing a particular request. A business transaction, which may each be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one embodiment, a specific tag may be added to packets by application specific agents for identifying business transactions (e.g., a custom header field attached to a hypertext transfer protocol (HTTP) payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)).

Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

A business application is the top-level container in the application intelligence model. A business application contains a set of related services and business transactions. In some implementations, a single business application may be needed to model the environment. In some implementations, the application intelligence model of the application environment can be divided into several business applications. Business applications can be organized differently based on the specifics of the application environment. One consideration is to organize the business applications in a way that reflects work teams in a particular organization, since role-based access controls in the Controller UI are oriented by business application.

A node in the application intelligence model corresponds to a monitored server or JVM in the application environment. A node is the smallest unit of the modeled environment. In general, a node corresponds to an individual application server, JVM, or Common Language Runtime (CLR) on which a monitoring Agent is installed. Each node identifies itself in the application intelligence model. The Agent installed at the node is configured to specify the name of the node, tier, and business application under which the Agent reports data to the Controller.

Business applications contain tiers, the unit in the application intelligence model that includes one or more nodes. Each node represents an instrumented service (such as a web application). While a node can be a distinct application in the application environment, in the application intelligence model, a node is a member of a tier, which, along with possibly many other tiers, make up the overall logical business application.

Tiers can be organized in the application intelligence model depending on a mental model of the monitored application environment. For example, identical nodes can be grouped into a single tier (such as a cluster of redundant servers). In some implementations, any set of nodes, identical or not, can be grouped for the purpose of treating certain performance metrics as a unit into a single tier.

The traffic in a business application flows among tiers and can be visualized in a flow map using lines among tiers. In addition, the lines indicating the traffic flows among tiers can be annotated with performance metrics. In the application intelligence model, there may not be any interaction among nodes within a single tier. Also, in some implementations, an application agent node cannot belong to more than one tier.

Similarly, a machine agent cannot belong to more than one tier. However, more than one machine agent can be installed on a machine.

A backend is a component that participates in the processing of a business transaction instance. A backend is not instrumented by an agent. A backend may be a web server, database, message queue, or other type of service. The agent recognizes calls to these backend services from instrumented code (called exit calls). When a service is not instrumented and cannot continue the transaction context of the call, the agent determines that the service is a backend component. The agent picks up the transaction context at the response at the backend and continues to follow the context of the transaction from there.

Performance information is available for the backend call. For detailed transaction analysis for the leg of a transaction processed by the backend, the database, web service, or other application need to be instrumented.

The application intelligence platform uses both self-learned baselines and configurable thresholds to help identify application issues. A complex distributed application has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed application intelligence platform can perform anomaly detection based on dynamic baselines or thresholds.

The disclosed application intelligence platform automatically calculates dynamic baselines for the monitored metrics, defining what is "normal" for each metric based on actual usage. The application intelligence platform uses these baselines to identify subsequent metrics whose values fall out of this normal range. Static thresholds that are tedious to set up and, in rapidly changing application environments, error-prone, are no longer needed.

The disclosed application intelligence platform can use configurable thresholds to maintain service level agreements (SLAs) and ensure optimum performance levels for system by detecting slow, very slow, and stalled transactions. Configurable thresholds provide a flexible way to associate the right business context with a slow request to isolate the root cause.

In addition, health rules can be set up with conditions that use the dynamically generated baselines to trigger alerts or initiate other types of remedial actions when performance problems are occurring or may be about to occur.

For example, dynamic baselines can be used to automatically establish what is considered normal behavior for a particular application. Policies and health rules can be used against baselines or other health indicators for a particular application to detect and troubleshoot problems before users are affected. Health rules can be used to define metric conditions to monitor, such as when the "average response time is four times slower than the baseline". The health rules can be created and modified based on the monitored application environment.

Examples of health rules for testing business transaction performance can include business transaction response time and business transaction error rate. For example, health rule that tests whether the business transaction response time is much higher than normal can define a critical condition as the combination of an average response time greater than the default baseline by 3 standard deviations and a load greater than 50 calls per minute. In some implementations, this health rule can define a warning condition as the combination of an average response time greater than the default baseline by 2 standard deviations and a load greater than 100 calls per minute. In some implementations, the health rule that tests whether the business transaction error rate is much higher than normal can define a critical condition as the combination of an error rate greater than the default baseline by 3 standard deviations and an error rate greater than 10 errors per minute and a load greater than 50 calls per minute. In some implementations, this health rule can define a warning condition as the combination of an error rate greater than the default baseline by 2 standard deviations and an error rate greater than 5 errors per minute and a load greater than 50 calls per minute. These are non-exhaustive and non-limiting examples of health rules and other health rules can be defined as desired by the user.

Policies can be configured to trigger actions when a health rule is violated or when any event occurs. Triggered actions can include notifications, diagnostic actions, auto-scaling capacity, running remediation scripts.

Most of the metrics relate to the overall performance of the application or business transaction (e.g., load, average response time, error rate, etc.) or of the application server infrastructure (e.g., percentage CPU busy, percentage of memory used, etc.). The Metric Browser in the controller UI can be used to view all of the metrics that the agents report to the controller.

In addition, special metrics called information points can be created to report on how a given business (as opposed to a given application) is performing. For example, the performance of the total revenue for a certain product or set of products can be monitored. Also, information points can be used to report on how a given code is performing, for example how many times a specific method is called and how long it is taking to execute. Moreover, extensions that use the machine agent can be created to report user defined custom metrics. These custom metrics are base-lined and reported in the controller, just like the built-in metrics.

All metrics can be accessed programmatically using a Representational State Transfer (REST) API that returns either the JavaScript Object Notation (JSON) or the eXtensible Markup Language (XML) format. Also, the REST API can be used to query and manipulate the application environment.

Snapshots provide a detailed picture of a given application at a certain point in time. Snapshots usually include call graphs that allow that enables drilling down to the line of code that may be causing performance problems. The most common snapshots are transaction snapshots.

Figure 4:
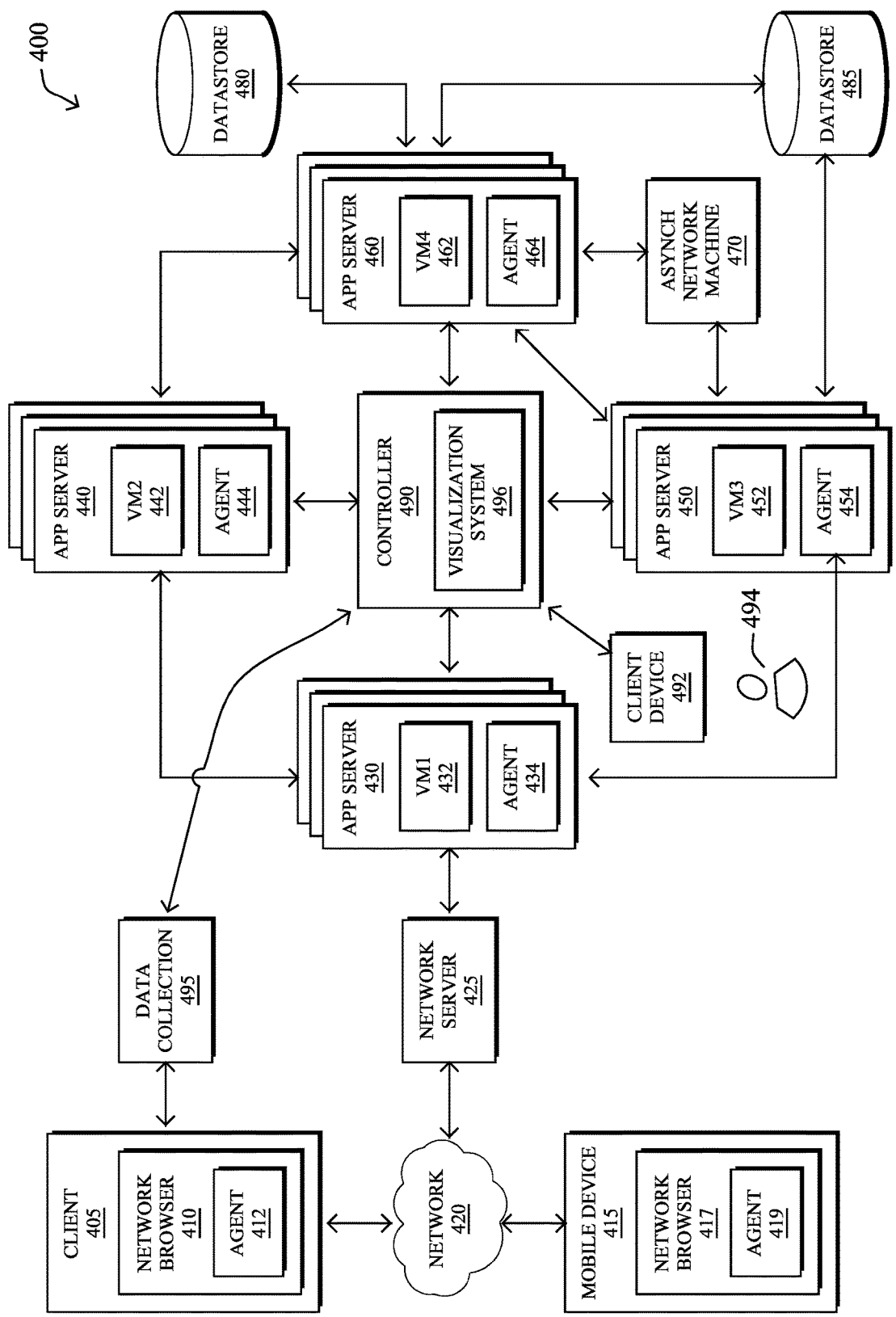
FIG. 4 illustrates an example system for implementing the example application intelligence platform.

FIG. 4 illustrates an example application intelligence platform (system) 400 for performing one or more aspects of the techniques herein. The system 400 in FIG. 4 includes client device 405 and 492, mobile device 415, network 420, network server 425, application servers 430, 440, 450, and 460, asynchronous network machine 470, data stores 480 and 485, controller 490, and data collection server 495. The controller 490 can include visualization system 496 for providing displaying of the report generated for performing the field name recommendations for field extraction as disclosed in the present disclosure. In some implementations, the visualization system 496 can be implemented in a separate machine (e.g., a server) different from the one hosting the controller 490.

Client device 405 may include network browser 410 and be implemented as a computing device, such as for example a laptop, desktop, workstation, or some other computing device. Network browser 410 may be a client application for viewing content provided by an application server, such as application server 430 via network server 425 over network 420.

Network browser 410 may include agent 412. Agent 412 may be installed on network browser 410 and/or client 405 as a network browser add-on, downloading the application to the server, or in some other manner. Agent 412 may be executed to monitor network browser 410, the operating system of client 405, and any other application, API, or another component of client 405. Agent 412 may determine network browser navigation timing metrics, access browser cookies, monitor code, and transmit data to data collection 495, controller 490, or another device. Agent 412 may perform other operations related to monitoring a request or a network at client 405 as discussed herein including report generating.

Mobile device 415 is connected to network 420 and may be implemented as a portable device suitable for sending and receiving content over a network, such as for example a mobile phone, smart phone, tablet computer, or other portable device. Both client device 405 and mobile device 415 may include hardware and/or software configured to access a web service provided by network server 425.

Mobile device 415 may include network browser 417 and an agent 419. Mobile device may also include client applications and other code that may be monitored by agent 419. Agent 419 may reside in and/or communicate with network browser 417, as well as communicate with other applications, an operating system, APIs and other hardware and software on mobile device 415. Agent 419 may have similar functionality as that described herein for agent 412 on client 405, and may report data to data collection server 495 and/or controller 490.

Network 420 may facilitate communication of data among different servers, devices and machines of system 400 (some connections shown with lines to network 420, some not shown). The network may be implemented as a private network, public network, intranet, the Internet, a cellular network, Wi-Fi network, VoIP network, or a combination of one or more of these networks. The network 420 may include one or more machines such as load balance machines and other machines.

Network server 425 is connected to network 420 and may receive and process requests received over network 420. Network server 425 may be implemented as one or more servers implementing a network service, and may be implemented on the same machine as application server 430 or one or more separate machines. When network 420 is the Internet, network server 425 may be implemented as a web server.

Application server 430 communicates with network server 425, application servers 440 and 450, and controller 490. Application server 450 may also communicate with other machines and devices (not illustrated in FIG. 4). Application server 430 may host an application or portions of a distributed application. The host application 432 may be in one of many platforms, such as including a Java, PHP, .Net, and Node.JS, be implemented as a Java virtual machine, or include some other host type. Application server 430 may also include one or more agents 434 (i.e., "modules"), including a language agent, machine agent, and network agent, and other software modules.

Application server 430 may be implemented as one server or multiple servers as illustrated in FIG. 4.

Application 432 and other software on application server 430 may be instrumented using byte code insertion, or byte code instrumentation (BCI), to modify the object code of the application or other software. The instrumented object code may include code used to detect calls received by application 432, calls sent by application 432, and communicate with agent 434 during execution of the application. BCI may also be used to monitor one or more sockets of the application and/or application server in order to monitor the socket and capture packets coming over the socket.

In some embodiments, server 430 may include applications and/or code other than a virtual machine. For example, servers 430, 440, 450, and 460 may each include Java code, .Net code, PHP code, Ruby code, C code, C++ or other binary code to implement applications and process requests received from a remote source. References to a virtual machine with respect to an application server are intended to be for exemplary purposes only.

Agents 434 on application server 430 may be installed, downloaded, embedded, or otherwise provided on application server 430. For example, agents 434 may be provided in server 430 by instrumentation of object code, downloading the agents to the server, or in some other manner. Agent 434 may be executed to monitor application server 430, monitor code running in a virtual machine 432 (or other program language, such as a PHP, .Net, or C program), machine resources, network layer data, and communicate with byte instrumented code on application server 430 and one or more applications on application server 430.

Each of agents 434, 444, 454, and 464 may include one or more agents, such as language agents, machine agents, and network agents. A language agent may be a type of agent that is suitable to run on a particular host. Examples of language agents include a Java agent, .Net agent, PHP agent, and other agents. The machine agent may collect data from a particular machine on which it is installed. A network agent may capture network information, such as data collected from a socket.

Agent 434 may detect operations such as receiving calls and sending requests by application server 430, resource usage, and incoming packets. Agent 434 may receive data, process the data, for example by aggregating data into metrics, and transmit the data and/or metrics to controller

490. Agent 434 may perform other operations related to monitoring applications and application server 430 as discussed herein. For example, agent 434 may identify other applications, share business transaction data, aggregate detected runtime data, and other operations.

An agent may operate to monitor a node, tier of nodes, or other entity. A node may be a software program or a hardware component (e.g., memory, processor, and so on). A tier of nodes may include a plurality of nodes which may process a similar business transaction, may be located on the same server, may be associated with each other in some other way, or may not be associated with each other.

A language agent may be an agent suitable to instrument or modify, collect data from, and reside on a host. The host may be a Java, PHP, .Net, Node.JS, or other type of platform. Language agents may collect flow data as well as data associated with the execution of a particular application. The language agent may instrument the lowest level of the application to gather the flow data. The flow data may indicate which tier is communicating with which tier and on which port. In some instances, the flow data collected from the language agent includes a source IP, a source port, a destination IP, and a destination port. The language agent may report the application data and call chain data to a controller. The language agent may report the collected flow data associated with a particular application to a network agent.

A network agent may be a standalone agent that resides on the host and collects network flow group data. The network flow group data may include a source IP, destination port, destination IP, and protocol information for network flow received by an application on which network agent is installed. The network agent may collect data by intercepting and performing packet capture on packets coming in from one or more network interfaces (e.g., so that data generated/received by all the applications using sockets can be intercepted). The network agent may receive flow data from a language agent that is associated with applications to be monitored. For flows in the flow group data that match flow data provided by the language agent, the network agent rolls up the flow data to determine metrics such as TCP throughput, TCP loss, latency, and bandwidth. The network agent may then report the metrics, flow group data, and call chain data to a controller. The network agent may also make system calls at an application server to determine system information, such as for example a host status check, a network status check, socket status, and other information.

A machine agent, which may be referred to as an infrastructure agent, may reside on the host and collect information regarding the machine which implements the host. A machine agent may collect and generate metrics from information such as processor usage, memory usage, and other hardware information.

Each of the language agent, network agent, and machine agent may report data to the controller. Controller 490 may be implemented as a remote server that communicates with agents located on one or more servers or machines. The controller may receive metrics, call chain data and other data, correlate the received data as part of a distributed transaction, and report the correlated data in the context of a distributed application implemented by one or more monitored applications and occurring over one or more monitored networks. The controller may provide reports, one or more user interfaces, and other information for a user.

Agent 434 may create a request identifier for a request received by server 430 (for example, a request received by a client 405 or 415 associated with a user or another source). The request identifier may be sent to client 405 or mobile device 415, whichever device sent the request. In embodiments, the request identifier may be created when data is collected and analyzed for a particular business transaction.

Each of application servers 440, 450, and 460 may include an application and agents. Each application may run on the corresponding application server. Each of applications 442, 452, and 462 on application servers 440-460 may operate similarly to application 432 and perform at least a portion of a distributed business transaction. Agents 444, 454, and 464 may monitor applications 442-462, collect and process data at runtime, and communicate with controller 490. The applications 432, 442, 452, and 462 may communicate with each other as part of performing a distributed transaction. Each application may call any application or method of another virtual machine.

Asynchronous network machine 470 may engage in asynchronous communications with one or more application servers, such as application server 450 and 460. For example, application server 450 may transmit several calls or messages to an asynchronous network machine. Rather than communicate back to application server 450, the asynchronous network machine may process the messages and eventually provide a response, such as a processed message, to application server 460. Because there is no return message from the asynchronous network machine to application server 450, the communications among them are asynchronous.

Data stores 480 and 485 may each be accessed by application servers such as application server 460. Data store 485 may also be accessed by application server 450. Each of data stores 480 and 485 may store data, process data, and return queries received from an application server. Each of data stores 480 and 485 may or may not include an agent.

Controller 490 may control and manage monitoring of business transactions distributed over application servers 430-460. In some embodiments, controller 490 may receive application data, including data associated with monitoring client requests at client 405 and mobile device 415, from data collection server 495. In some embodiments, controller 490 may receive application monitoring data and network data from each of agents 412, 419, 434, 444, and 454 (also referred to herein as "application monitoring agents"). Controller 490 may associate portions of business transaction data, communicate with agents to configure collection of data, and provide performance data and reporting through an interface. The interface may be viewed as a web-based interface viewable by client device 492, which may be a mobile device, client device, or any other platform for viewing an interface provided by controller 490. In some embodiments, a client device 492 may directly communicate with controller 490 to view an interface for monitoring data.

Client device 492 may include any computing device, including a mobile device or a client computer such as a desktop, work station or other computing device. Client computer 492 may communicate with controller 490 to create and view a custom interface. In some embodiments, controller 490 provides an interface for creating and viewing the custom interface as a content page, e.g., a web page, which may be provided to and rendered through a network browser application on client device 492.

Applications 432, 442, 452, and 462 may be any of several types of applications. Examples of applications that may implement applications 432-462 include a Java, PHP, .Net, Node.JS, and other applications.

Figure 5:
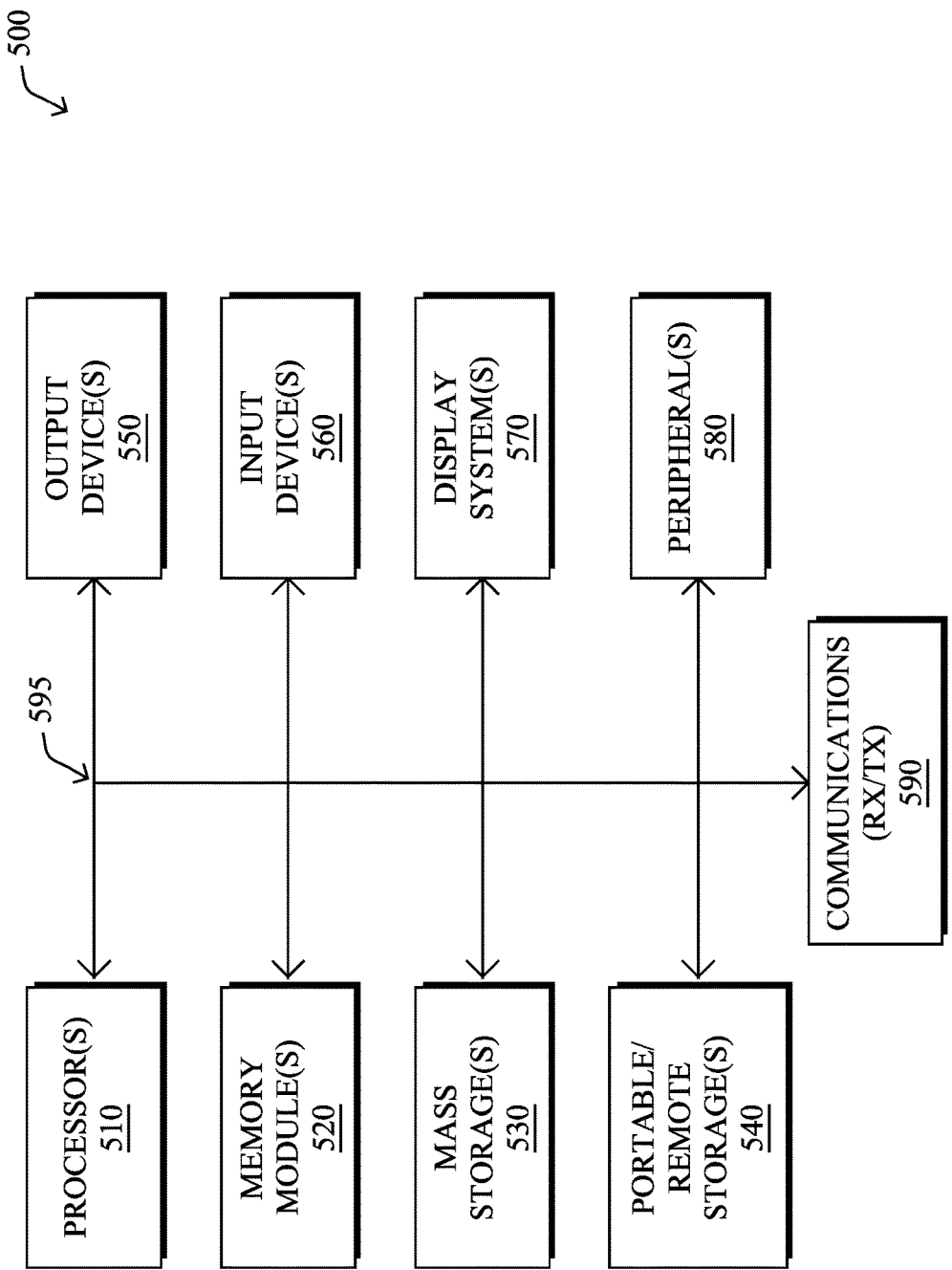
FIG. 5 illustrates an example computing system implementing the disclosed technology.

FIG. 5 is a block diagram of a computer system 500 for implementing the present technology, which is a specific implementation of device 200 of FIG. 2 above. System 500 of FIG. 5 may be implemented in the contexts of the likes of clients 405, 492, network server 425, servers 430, 440, 450, 460, asynchronous network machine 470, and controller 490 of FIG. 4. (Note that the specifically configured system 500 of FIG. 5 and the customized device 200 of FIG. 2 are not meant to be mutually exclusive, and the techniques herein may be performed by any suitably configured computing device.)

The computing system 500 of FIG. 5 includes one or more processors 510 and memory 520. Main memory 520 stores, in part, instructions and data for execution by processor 510. Main memory 520 can store the executable code when in operation. The system 500 of FIG. 5 further includes a mass storage device 530, portable storage medium drive(s) 540, output devices 550, user input devices 560, a graphics display 570, and peripheral devices 580.

The components shown in FIG. 5 are depicted as being connected via a single bus 590. However, the components may be connected through one or more data transport means. For example, processor unit 510 and main memory 520 may be connected via a local microprocessor bus, and the mass storage device 530, peripheral device(s) 580, portable or remote storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 can store the system software for implementing embodiments of the present disclosure for purposes of loading that software into main memory 520.

Portable storage device 540 operates in conjunction with a portable non-volatile storage medium, such as a compact disk, digital video disk, magnetic disk, flash storage, etc. to input and output data and code to and from the computer system 500 of FIG. 5. The system software for implementing embodiments of the present disclosure may be stored on such a portable medium and input to the computer system 500 via the portable storage device 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system 570 may include a liquid crystal display (LCD) or other suitable display device. Display system 570 receives textual and graphical information, and processes the information for output to the display device.

Peripherals 580 may include any type of computer support device to add additional functionality to the computer system. For example, peripheral device(s) 580 may include a modem or a router.

The components contained in the computer system 500 of FIG. 5 can include a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Apple OS, and other suitable operating systems, including mobile versions.

When implementing a mobile device such as smart phone or tablet computer, the computer system 500 of FIG. 5 may include one or more antennas, radios, and other circuitry for communicating over wireless signals, such as for example communication using Wi-Fi, cellular, or other wireless signals.

Agent Profiler

As noted above, many software tools, including performance monitoring systems, make use of software agents, such as Java Agents, to provide instrumentation capabilities to an application. However, there are currently no mechanisms to measure the resource overhead of software agents, or the actions of the agents, or identifying potential conflicts between multiple agents.

The techniques herein, therefore, provide for an agent profiler to monitor activities and performance of software agents. In particular, in one embodiment, an "Agent Profiler" is designed to deeply audit, monitor, and stress test any software agent (e.g., Java Agent or any other interface for a given runtime to instrument that runtime) to help optimize and identify performance issues, as well as exposing conflicts between multiple running agents. Currently, there is no other tool that creates this "container" type system that would allow the kind of detailed monitoring and assessment.

As described in greater detail below, the illustrative Agent Profiler herein creates a "container" (or "harness environment") for Java instrumentation which acts as a proxy for all software agent calls in and out of the Java instrumentation system. (Notably, though the description herein frequently references "Java" for agents, instrumentation, runtime, etc., other suitable platforms with software agents may also be used according to the techniques herein.) The techniques herein can run and monitor (manage and profile) the performance of any agent and multiple agents, having the ability to start and stop, as well as monitor and even prevent any conflicts between agents. For example, software agents may do any number of actions, such as application performance monitoring, dev ops, security, runtime application self-protection (RASP), etc. That is, by monitoring the proxy-based instrumentation interface (e.g., the Java instrumentation interface), the techniques herein can control the software agents (start/stop, prevent, roll-back, etc.), determine the resource overhead for any of these software agents (time actions, monitor and correlate resource utilizations, etc.) and complete an audit of all of the actions by these agents, accordingly.

Figure 6A:
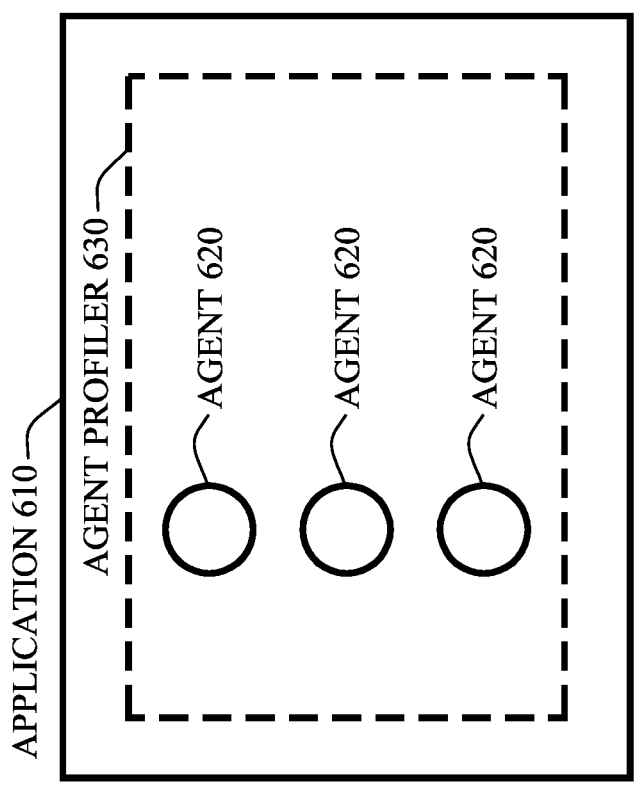
FIGS. 6A-6B illustrate an example of an agent profiler configuration to monitor activities and performance of software agents in accordance with one or more embodiments described herein.
Figure 6B:
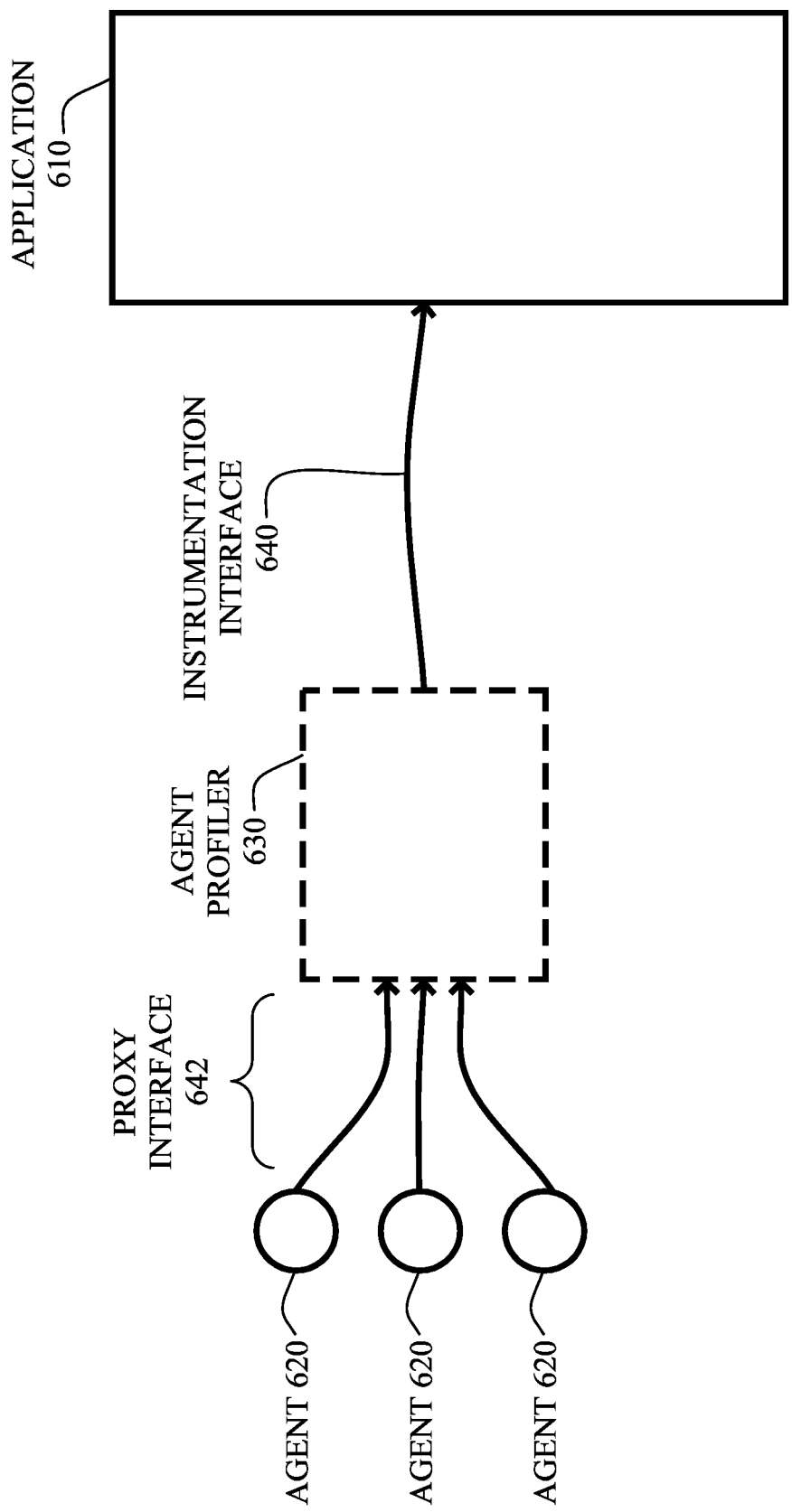

Operationally, the techniques herein create an "instrumentation container" system that wraps around one or more software agents (e.g., Java Agents). Normally, for an application, a javaagent switch is used to launch a software agent and that launched agent talks directly to the JVM. With reference generally to FIGS. 6A-6B, the techniques herein adjust the relationship between an application (JVM) 610 and its agents 620 to start the Agent Profiler 630 as the only javaagent started with the switch, and then the Agent Profiler itself has the ability to start one or more software agents 620 (on demand), and then monitors the agents and can either grant or deny access to the JVM instrumentation system as it monitors it. (Note that in one embodiment, a configuration setting may allow a choice as to whether the profiler is launched as a separate thread versus in the JVM premain calling thread.)

As shown in FIG. 6A, the techniques herein are directed at monitoring, assessing, and controlling an application 610's software agent(s) (application agent(s)) 620 by "boxing" the agent(s) into a "container" of the agent profiler 630 so that the profiler can measure the resource usage of the agent(s). Shown differently in FIG. 6B, this "container" is essentially created by the configuration of the instrumentation interfaces 640 (e.g., for Java Agents in particular, the "java.lang.instrument.Instrumentation" interface), where the Agent Profiler 630 provides an Instrumentation Handle to a "proxy" implementation 642 (versus the real JVM instrumentation handle 640) to the software agent(s) 620, and essentially starts up the software agent(s) in a similar manner to how the JVM would start them. Notably, this proxy operation is completely transparent to the software agent(s), where each call made by an agent to the instrumentation implementation 640 is actually made to the Agent Profiler 630 (via the proxy instrumentation 642), which can then register the activities of the agent and also monitor situations with multiple agents (e.g., particularly when changing the same class files), as described in greater detail below. That is, by monitoring calls to that interface (intercepting calls on the proxy implementation interface 642), the Agent Profiler 630 can achieve granular visibility into aspects of a software agent of any kind and can control the interactions with the JVM as well.

Specifically, key features of the Agent Profiler defined herein, notably without requiring any changes to the software agent (e.g., Java Agent) code, may include:

Tracing/Recording/Enabling software agent instrumentation activities, such as:
  general calls to the instrumentation API (e.g., the JVM instrumentation API—java.lang.instrument.Instrumentation), calls to retransform classes, changes made to classes in the transform, getAllLoadedClasses call, etc.;
Monitoring of all individual agent thread activities, such as: CPU, memory allocation, lock waits, block count, time, etc.;
Enabling/Disabling instrumentation, for things such as: CPU time tracking, lock contention tracking,
Determining differences in instrumented classes, for example: determining a recorded original class, determining a recorded modified class, determining differences between the instrumentation, identifying conflicts between multiple software agents (e.g., one changes a class, another changes the class back, etc.), providing arbitration/conflict resolution between multiple software agents (e.g., prioritizing one over the other or otherwise);
Determining class loader hierarchy (e.g., identifying agent loader and delegation chains);
Classifying general JVM health, such as through monitoring: garbage collection and duration, CPU, Heap and NonHeap, Metaspace, thread count and creation rate, etc.; and
Stack Sampling, as described below (e.g., detecting threads, thread status, hotspots, etc.).

As context on software agents in general, and Java Agents in particular (as an example throughout), a software agent is designed to be launched as part of an application usually for the purpose of monitoring, logging, security, and so on. In general, a "bootstrap" class subset is packaged into a jar file which has a manifest that describes the available functions as well as appending to existing application and system classpaths. Upon startup of the underlying application, there is typically a switch (for example, a—javaagent:PATH:javaagent.jar switch) that causes the runtime to give control to the agent class specified in the manifest and calls the "premain" method called and passing the "Instrumentation Handle" and associated parameters. Once control is given, the premain method would generally create a "transformer" where the classes can be modified (i.e., where an agent provides an implementation of this interface in order to transform class files—before the class is defined by the JVM) which will receive class bytes as they are loaded via the transform method. At this point, the transform method can return the original bytes or modified bytes that might contain instrumentation. (Note that "retransforming" is causing a class to go through a transformer so the class can be modified.)

The Agent Profiler 630 is illustratively a special kind of software agent (e.g., a Java Agent) that discovers managed software agents 620 for an application 610 by reading the descriptions in the configurations file of the application, and then launches the discovered agents in a managed (proxy) environment where all requests made by an agent actually go directly to the Agent Profiler (proxy instrumentation) versus the JVM (application instrumentation). In particular, as mentioned above, the Agent Profiler 630 provides the instrumentation ecosystem for the managed agents and acts as an "Instrumentation Proxy", either passing the instrumentation (modifications, transformations, etc.) to the JVM or blocking it depending on configuration. In addition, these software agent activities are audited, and the agent profiler contains instrumentation of its own to monitor metrics and basic vital signs of the software agents and JVM as well as to perform garbage collection and to detect and mitigate locking issues or other compatibility issues between different software agents, each as described below. In other words, the agent profiler can act as a management system, providing high visibility into the operations of a software agent (e.g., Java Agent).

In detail, to add a software agent to the Agent Profiler, the Agent Profiler may first be attached to the application via a javaagent switch (e.g.,—javaagent:../AgentProfiler/prod/lib/agentProfilerPremain.jar), and then any of the software agents that are in the application startup are removed (if any are preconfigured there). Any configuration changes may be set (as described below), and then the software agents are converted to be used in the Agent Profiler proxy environment, and the Agent Profiler is started.

An example of this is shown in FIGS. 7A-7B, where an example software agent called "Example" (code 710) is shown in FIG. 7A, which would be converted by a switch on a startup line to the code 720 shown in FIG. 7B. In general, the changes made (shown in bold/underlined text in FIGS. 7A-7B) result in the agent pointing to the Agent Profiler as shown in FIG. 7B (along with configuration settings), rather than the original "TestApp" as shown in FIG. 7A. Notably, as shown:

javaagent: the name of the agent jar file with the premain entry;
Installed: Fully Qualified directory path to the agent jar file;
name: Unique Managed Agent name to be referred to;
params: Additional javaagent parameters to be passed;
loaded: Whether or not to load;
properties: additional java agent properties either as—Dkey=value or command separated key=value (note that properties already exist in the startup line, they do not have to moved here);
addbootjar: additional jar to add to the boot classpath;
addpackages: additional packages that belong to this agent;
active: whether or not the agent is active (i.e., toggle agents within environment);
getloaded-classes: Allows all loaded classes to be sent to this agent OR an empty list;

redefine-classes: Allows for the use of redefineClasses API by this agent;

transform-classes: Allows transforms by this agent;

modify-classes: Allows transforms, but NOT class byte changes by this agent; and retransform-classes: Allows retransforms to be generated by this agent.

According to the techniques herein, the agent profiler, though exceptional at measuring the performance of Java Agents, also has many features that are focused on the JVM in general. For example, the following commands are made available through an interface with the agent profiler, where the agent profiler may determine and/or control the following standard actions through the proxy interface defined above (e.g., for automated API activity, or else in response to a user interface command):

Show All Threads—show all threads;

Show Runtime—show the Java runtime info;

Show Properties—show properties and environmental variables;

Show Network—show current network interfaces;

Show Classloaders—show all classloaders and associated classes;

Full Garbage Collection—force a full garbage collection (gc);

Create Heap Dump—creates a heap dump;

Show Loaded Class—show loaded class with method, options:

class=class[&method=method];

Show Thread Local—show all Thread Local storage;

Show Memory—show current heap memory; and

Show File—show file, options: showfile=file.

In addition, according to the techniques herein, the agent profiler also provides agent profiler dependent operations, enabling/disabling of JVM instrumentation, management of software agents, visibility into files, visibility into locking, visibility into garbage collection, class instrumentation, and "stack sampling", each of which being described further below.

For instance, regarding agent profiler dependent operations, the techniques herein may show an agent profiler log, show the profiler's current configuration, and can allow browsing the agent profiler files (e.g., as a file/director interface or otherwise), such as .yal files, .jke files, .log files, libraries, and so on. In addition, agent profiler statistics (stats) may be collected and shared (reported, displayed, analyzed, etc.), such as a table 800 shown in FIG. 8, showing various metrics 810 and values 820, e.g., "ActivityEvents", "CPUTimeEnabled", "Current Loaded Classes", "Current Threads", and so on. Furthermore, other profiler operations may include stopping the JVM (shutting down the Agent Profiler JVM), launching shell script operation(s) (e.g., adding &count=count and/or &delay=sec to execute multiple times with a delay), setting a Help Port to echo back if behind a proxy or firewall, etc.

In addition, in one embodiment, the agent profiler herein can enable/disable JVM instrumentation, such as by enabling or disabling thread CPU time tracking (e.g., via "?cputime=true|false"), and/or by enabling or disabling lock contention tracking (e.g., via "?lockcontention=true|false").

Additional embodiments of the agent profiler allow for the general management of software agents. For instance, in one embodiment, the agent profiler can provide/show a list of all managed agents, i.e., all agents within the proxy instrumentation environment described above, as well as all of their associated files (e.g., .jar files, configuration files, etc.). Further, the techniques herein can show cached agent activity or activity logs, either for all managed agents or only one or more named agents (e.g., launching, loading jars, adding jars, etc.), as well as showing current system properties/settings for the agents. As shown in FIG. 9, the techniques herein may also show agent threads, such as in a display 900 indicating a number of threads (name 910, ID 920), their state 930 (e.g., TIMED_WAITING, WAITING, etc.), CPU utilization (max) 940, various counters 950, timers 960, thread location 970, and so on. (Display 900 is not meant to be limiting to the present disclosure, and is merely an example of various information regarding threads of particular software agents, accordingly.)

More than merely showing files of the software agents (e.g., in a directory), the techniques herein can also show aspects of thread locking, such as showing current deadlocks, showing threads owning locks and threads waiting on those locks (FIG. 10), as well as showing all threads waiting on locks (FIG. 11). FIG. 10, for example, shows a table 1000 listing a number of threads by name 1010, ID 1020, and their corresponding state 1030, where the table also indicates whether the thread owns a lock 1040 and those other threads 1050 waiting on that lock. Conversely, in FIG. 11, table 1100 shows threads by name 1110 and ID 1120, state 1030 and a LockName 1140 of the lock they are waiting on, as well as other metrics 1150, such as how long the wait has been, and so on.

The techniques herein may also provide insight into garbage collection, such as showing all instances of garbage collection activity, such as scavenging allocation failures and metadata, as well as associated metrics, such as time, duration, reduction in memory size, etc. In addition, the techniques herein can also show garbage collection statistics, such as average and maximum durations, average and maximum collections, and so on for each type of garbage collection. Other commands regarding garbage collection are also made available by the agent profiler herein, such as allowing a thread to start to use Heap Space or Metaspace Space (with settings for delay, size or percent, etc.), to show used memory (Heap and Metaspace), and to clear Heap or Metaspace memory created.

According to one or more embodiments of the present disclosure, instrumented classes can be detected, shown, and processed by the Agent Profiler herein. For instance, FIG. 12 illustrates an example table 1200 of classes instrumented by managed agents, where each entry has a time "LastInstrumented" 1210, a number of "TimesInstrumented" 1220, an "AgentsModifying" 1230 for the associated Class 1240. Other information may also be included, such as the Loader 1250 used, the OldBytesSize 1260 and NewBytesSize 1270, a list of actual changes 1280 to the class, and so on. Additionally, FIG. 13 illustrates another table 1300 showing retransformed classes (showing all classes retransformed by managed agents), and may identify the class 1310, the Loader 1320, and the number of times 1330 the class was retransformed. Other class instrumentation controls are provided herein as well, such as, e.g., "Uninstrument All" classes, "Reinstrument All" classes, or "Retransform All" classes (including for each whether to log each class, add a delay between each class, ignore certain instrumentation filtering, etc.). Controls may also include showing all modified classes, showing all original classes, and so on.

As mentioned above, one or more embodiments herein may provide for "Stack Sampling", optionally as an alternative to instrumentation. Though stack sampling, in and of itself, is a known technique, the embodiments herein refine stack sampling to provide a more accurate methodology over current mechanisms. In particular, though current stack sampling examines all stacks for all threads, the techniques herein provide greater accuracy by intelligently determining (and then filtering to) which stacks and/or threads are related to transactions, and further focusing on which stacks and threads are actually active (since some indicators do not definitively indicate activity: e.g., RUNNABLE does not always equal active, and is always shown when in native mode).

Said differently, the "stack sampler" techniques herein are specifically able to filter out samples by:
  Only choosing transactions by looking at the Thread Name;
  Only choosing transactions by looking at what is in the call stack; and
  Eliminating non-active transactions by recognizing class/methods that indicate it is idle in the Thread Pool.

The end result is something that is "razor accurate" in eliminating noise—unlike conventional samplers.

According to one or more embodiments of the techniques herein, the agent profiler stack sampler may be tuned for the application, specifically. That is, one objective of a stack sampler is to take stack trace samples at a periodic interval and to somehow indicate areas where the application is using CPU by the frequency in which a method and line number shows up as being current and the frequency that a thread shows up being actively running. However, since it is difficult to effectively determine this information, the agent profiler sampler contains configuration settings to fine-tune this process.

For instance, in one embodiment herein, the techniques may also use thread names to determine if a transaction is occurring. That is, in most cases, the threads of interest will be the transaction threads as they are the most active and the most important—for this reason, it is important to isolate those threads. The techniques herein, therefore, take advantage of the fact that most application servers use a standard naming convention for the threads, which can be used in the following configuration filter:
  sampler-filter-threads: prefix, prefix, etc.; and
  sampler-filter-thread-include: true|false (set to either include or exclude what is in the sampler-filter-threads configuration).

In addition, in one embodiment, the techniques herein may use stack contents to determine if an event is a transaction. For instance, there may also be times when a transaction must be identified by the stack contents such as a class/method combination using a filter, such as, for example:
  sampler-filter-stacks: package.class.method, package.class.method, etc.
  sampler-filter-stack-include: true|false (set to either include or exclude what is in the sampler-filter-stacks configuration).

The techniques herein are also particularly helpful in determining if a thread is active. Specifically, since there is limited utility in sampling a thread that is not actively attempting to execute a transaction, the techniques herein may exclude these threads from the sampling process. For example, Java has the following thread states available:
  NEW—A thread that has not yet started is in this state;
  RUNNABLE—A thread executing in the Java virtual machine is in this state;
  BLOCKED—A thread that is blocked waiting for a monitor lock is in this state;
  WAITING—A thread that is waiting indefinitely for another thread to perform a particular action is in this state;
  TIMED_WAITING—A thread that is waiting for another thread to perform an action for up to a specified waiting time is in this state; and
  TERMINATED—A thread that has exited is in this state.

Accordingly, the only states that could be entered during a transaction would be: RUNNABLE, BLOCKED, WAITING, and TIMED_WAITING. Notably, the RUNNABLE state can be somewhat misleading as all executions in native code will have this state, and the WAITING and TIMED_WAITING states are often merely threads in a thread pool waiting to be used. Also, the BLOCKED state is the one state that should not be seen in back-to-back samples, which would normally indicate a real issue is at hand. However, there are certain methods that always indicate that the thread is idle, such as, e.g., (currently):
  com.ibm.io.async.AsyncLibrary.aio_getioev2,
  sun.misc.Unsafe.park,
  java.lang.Object.wait,
  java.net.PlainSocketImpl.socketAccept,
  sun.nio.ch.KQueueArrayWrapper.kevent0,
  java.lang.Thread.sleep,
  java.util.concurrent.locks.LockSupport.park, and
  java.util.concurrent.locks.AbstractQueuedSynchronizer$ConditionObject.await.

As such, by setting the following property, the sampler can be instructed to NOT sample any threads that are currently executing these "idle" methods:
  sampler-considered-idle-stack-contents:
    java.util.concurrent.locks.AbstractQueuedSynchronizer$ConditionObject.await.

In general, the Agent Profiler has numerous configuration settings to control how it performs and manages the software agents. For instance, in addition to several core configuration settings (e.g., where to log, whether to track agent actions, how large a cache for agent activity tracking, where to look for tools.jar, whether to launch the agent profiler as a separate thread versus in the JVM premain calling thread, and so on), a number of other configurations may be set for controlled operation of the agent profiler:
  Core Instrumentation Configurations:
    Enable/Disable the agent profiler transformer (enabled to allow any agent to transform and retransform);
    Where to write modified classes;
    Where to write original classes;
    Whether to log modified and original classes;
    Whether to detect and comment on conflicts;
    Whether and how to stop conflicts;
    Whether to verify class correctness (if fails—class is not modified);
    Whether to compare classes and outline differences;
    How many classes at a time to allow in a retransform; and
    Whether to log all retransformed classes.
  Class Filtering Configurations:
    Whether an instrumentation filter applies for all actions (whether to apply to either just retransforms OR to getAllLoadedClasses, retransform, transform, and modify class);
    Which classes to include (only allow these classes to be seen); and
    Which classes to exclude (exclude these classes from being seen).
  Global Agent Enablement Configurations:
    Enable/Disable agents to getAllLoadedClasses;
    Enable/Disable redefining classes;
    Enable/Disable transform of classes;

Enables/Disable classes to be modified in transform; and

Enable/Disable retransform of classes.

Additional JVM Tracking Configurations:
  Whether to track lock contention;
  Whether to track Garbage Collection; and
  Whether to track thread CPU.

Diagnostics Server Configurations:
  Which port for the server;
  Which URL/context for the server (e.g., /agentprofiler); and
  Password for server.

Stack Sampling Configurations:
  Consider particular threads idle if executing any listed methods
  Consider particular threads idle if certain strings are in the current stack;
  Only sample threads that contains a particular string;
  Only sample stacks if thread stack contains this class/method/etc. string;
  Whether to include certain threads;
  Whether to include certain stacks;
  Maximum number of threads to save in sampler; and
  Maximum number of Hotspot methods to save in sampler.

Specific Software Agent Configurations:
  The name of the agent jar file with the premain entry;
  The fully qualified directory path to the agent jar file;
  A unique managed agent name to be referred to;
  Additional javaagent parameters to be passed;
  Whether or not to load the software agent;
  Additional java agent properties;
  Additional jars to add to the boot classpath;
  Additional packages that belong to this agent;
  Whether or not the agent is active;
  Whether to allow all loaded classes to be sent to this agent;
  Whether to allow for the use of redefineClasses API by this agent;
  Whether to allow transforms by this agent;
  Whether to allow modifying classes (allows transforms, but NOT class byte changes) by this agent; and
  Whether to allow class retransforms to be generated by this agent.

According to the present disclosure, thread statistics may be determined through stack sampling and then shown/processed, accordingly. For instance, certain threads may be shown (e.g., all monitored, only those threads that are active, only those with active methods, etc.), certain information/statistics/metrics may be shown, certain rankings may be performed (e.g., most actions, longest waits, highest CPU times, etc.), and other information, such as determining "hotspots" of method activity, and so on, may be determined and shown as configured. For example, FIG. 14 illustrates an example table 1400 of sampled stack statistics, where threads 1410 (with IDs 1420) are shown with their current status 1430, as well as various metrics such as how many samples were taken (1440), how many times the thread was active (1450), the CPU usage (max) 1460, wait time 1470 (e.g., cumulative, maximum, average, etc.), and the last trace collected with that thread (1480). Conversely, FIG. 15 illustrates a table 1500 arranged to show sampler "hotspots", showing an active methods summary (location 1510, samples 1520, activity 1530, CPU utilization 1540, last thread 1550, last trace 1560, etc.).

According to one or more embodiments of the techniques herein, the Agent Profiler is a diagnostic tool, providing a test harness (Proxy/Container environment) for launching and monitoring one or more software agents (Java Agents). The Agent Profiler herein is not meant to be a replacement for the software agent(s), but since all instrumentation calls must pass through the Agent Profiler, the techniques herein provide a very granular view of the software agents, and also provide the ability to perform various actions on the software agents without changing code in the agent(s).

In particular, the Agent Profiler provides abilities that not only help in customer support cases, but also in optimization/refactoring of developer's agents, through the following capabilities:

Controlling/Monitoring all activities of the software agent (any version, and any agent) without code changes or patches to the software agent itself which is useful in the field to reproduce crashes (e.g., through stress testing/repetitive uninstrument/instrument and retransform/transform). The level of control over the software agent allows the Profiler to force the agent to perform things that may otherwise be impossible to replicate in real life. (Note that in one embodiment, Curl commands may be used to automate the calls for testing, such as via a curlit.sh script (e.g., running a routine repeated with optional delays between repetitions) which appends the output to a curlResults.html file.

Monitoring "hyperactivity" in the software agent itself for diagnostics purposes (e.g., discover the overhead for due to an agent constantly calling a method, such as getAllLoadedClasses).

Monitoring the CPU and Wall Clock time for all agent operations such as transform, retransform (bulk and individual), getAllLoadedClasses( )—this is the time the agent takes to do these functions—for example, there are instances where the agent is taking long periods of time to re-evaluate classes during retransform.

Mitigating risk between agents in situations where agents had to run alongside another agent or identify any conflicts. For example, the Agent Profiler can identify situations where two agents are instrumenting the same class, and can prioritize one agent over the other, or else may perform other mitigation techniques.

Recording and comparing class changes (via instrumentation) on the fly written to a report (e.g., original and modified classes written to disk in .class format), checking new method sizes, constant pool attributes, and performing overall class verification automatically. Also, the classes may be decompiled into bytecode using local javap utility (if tools.jar is available).

Locating and monitoring agent threads for CPU, Memory, and Lock Contention overhead.

Exposing/flagging high-latency interceptors and overall interceptor latency time for software agents.

Including a "smart Thread Sampler" built in that can useful to exonerate OR implicate a particular software agent as having an issue. In addition, the stack sampler may be used to make recommendations on what should be instrumented by identifying high latency method calls and code hotspots.

The techniques herein also provide for additional actions after the monitoring is performed. That is, steps can be made to correct any actions, or to suggest changes to applications/network operations to manage the application based on the information obtained, such as the following example scenarios:

A Lock Contention exposes blocked chains (lock holders) dependencies and can identify to customers clear issues in architecture.

The Stack Sampler has identified hotspots in customer code both in specific Threads and in class Methods—the Sampler is configured intelligently to only monitor specific agent and application threads that have transactions, as well as to detect when a thread is idle in a thread pool (parked) OR actually doing something. It reports and highlights all of this (e.g., via a web interface).

Network contention and issues are identified when "accept" threads are BLOCKED by another accept, and they have been blocked for a long time. In this instance, it is clear the network traffic is overwhelming the software, and remediation (reporting, mitigation, etc.) needs to take place.

The Agent Profiler identifies which classes/methods to allow instrumentation to optimize a particular software agent on the fly, and without the need for agent configuration changes.

Figure 16:
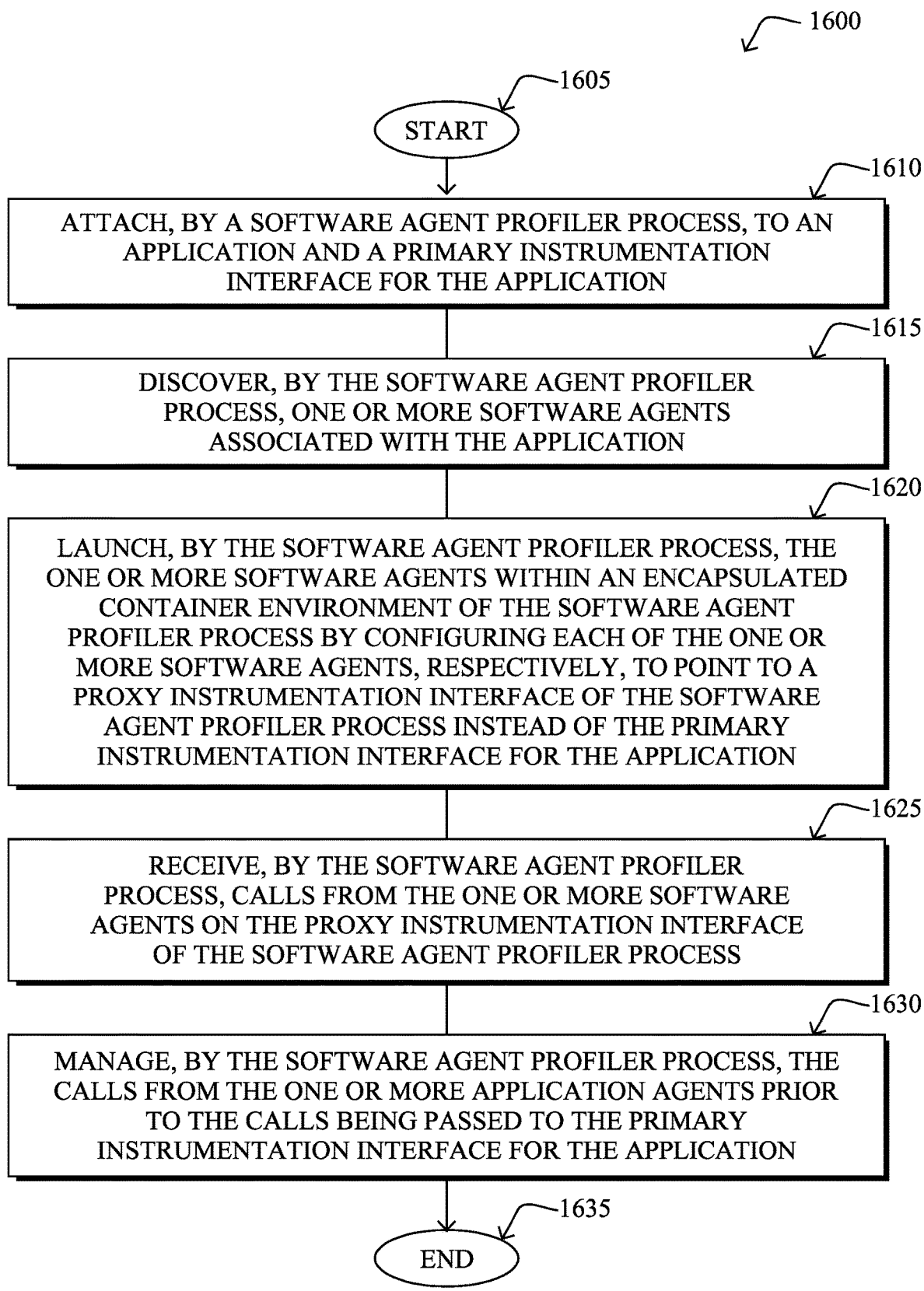
FIG. 16 illustrates an example simplified procedure for agent profiler to monitor activities and performance of software agents in accordance with one or more embodiments described herein.

In closing, FIG. 16 illustrates an example simplified procedure for agent profiler to monitor activities and performance of software agents in accordance with one or more embodiments described herein. For example, a non-generic, specifically configured device (e.g., device 200) may perform procedure 1600 by executing stored instructions (e.g., process 248, such as an application agent profiler process or "Agent Profiler" process). The procedure 1600 may start at step 1605, and continues to step 1610, where, as described in greater detail above, a software agent profiler process (agent profiler 630) attaches/initializes to an application 610 and a primary instrumentation interface 640 for the application (e.g., by performing a javaagent switch operation, as described above). In step 1615, the software agent profiler process may then discover one or more software agents (e.g., Java agents) 620 associated with the application (e.g., by reading a configuration file of the application), and may then launch the one or more software agents (e.g., after determining whether to launch particular software agents—enabling/disabling certain JVM instrumentation) within an encapsulated container environment of the software agent profiler process. In particular, as described in detail above, the encapsulated container environment is established by configuring each of the one or more software agents, respectively, to point to a proxy instrumentation interface 642 of the software agent profiler process 630 instead of the primary instrumentation interface 640 for the application.

In step 1625, the software agent profiler process may now receive calls from the one or more software agents on the proxy instrumentation interface of the software agent profiler process, thus allowing tracing/recording/instrumenting software agent activities such as: general calls to the JVM instrumentation API, calls to retransform classes, changes made to classes in the transform, getAllLoadedClasses calls, and so on.

In step 1630, the techniques herein may then provide for the software agent profiler process to "manage" the calls from the one or more application agents prior to the calls being passed to the primary instrumentation interface for the application. In particular, this managing step may comprise a number of different embodiments as described above. For instance, managing may comprise monitoring resource usage based on receiving the calls (e.g., CPU, memory allocation, Lock Waits/Block Count/Time, etc.), and/or auditing the one or more software agents based on the calls (e.g., CPU Time tracking, Lock Contention tracking, Garbage collection and duration, Thread Count/Creation rate, and so on), and/or also recording and reporting class changes made within the calls. Alternatively or in addition, managing in step 1630 may comprise determining first whether to pass the call to the primary instrumentation interface for the application or to block the call from passing to the primary instrumentation interface for the application. Further components of managing the calls may be based on mitigating detected issues, such as, e.g., monitoring the one or more software agents for hyperactivity based on the calls and mitigating detected hyperactivity, monitoring the one or more software agents for latency times based on the calls and mitigating detected high latency, mitigating conflicts between a plurality of software agents of the one or more software agents, and so on. Step 1630, therefore, essentially encompasses many of the agent profiler capabilities described herein based on having access to, and control of, the instrumentation interface between the software agents and the application/JVM.

The simplified procedure 1600 may then end in step 1635, notably with the ability to continue ingesting and clustering data. Other steps may also be included generally within procedure 1600. For example, such steps (or, more generally, such additions to steps already specifically illustrated above), may include: generating test conditions using artificial calls to the primary instrumentation interface for the application; performing a stack sampler operation on threads of the one or more software agents, wherein the stack sampler operation is filtered to monitor only specific threads that are active transaction-based threads (e.g., for hotspots, etc.); and so on.

It should be noted that while certain steps within procedure 1600 may be optional as described above, the steps shown in FIG. 16 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for an agent profiler to monitor activities and performance of software agents. In particular, the techniques herein can be used to optimize software agent operation and interaction where the techniques herein specifically create an environment that allows for the profiling the agents (e.g., Java Agents). For instance, the techniques herein provide greater precision in terms of identifying where in an application agent instrumentation should be focused, and may be used as a pre proof-of-concept tool, to streamline and make more precise the effectiveness of monitoring agents with a particular customer application by allowing the Agent Profiler to create a customized configuration for the monitoring agent being implemented. Furthermore, the techniques herein may be used to evaluate the performance and compatibility of particular software agents with other agents operating on the same application. Notably, the techniques herein can also evaluate the performance without requiring load tools to reproduce crashes by putting different stress conditions on the application's agent(s). Moreover, the techniques herein greatly improve customer support capabilities, but expanding the visibility and control into the software agents of a particular application.

Specifically, the techniques herein find threads, packages, etc. by using the agent manifest and essentially mapping package names into classes, class loaders, and thread context class loaders, which is unique for discovering the "composition" of the agent. Also the ability to "chain" the lock holders and lock waiters and tie them back to the agent is unique, and no tool exists that can turn on/off agent functions, control un-instrument/instrument, determine conflicts with other agents, and so on, all without making code changes to the agents themselves. Last, the stack sampling techniques provide the ability to focus on agent method/interceptor presence as executing methods, determining what is actively executing, blocked/waiting in execution, or just "parked" as a thread pool idle thread. (Where, notably, emphasis of the sampling is on threads that indicate an active transaction.)

In still further embodiments of the techniques herein, a business impact of the software agents' performance can also be quantified. That is, because of issues related to specific applications/processes (e.g., lost traffic, slower servers, overloaded network links, etc.), various corresponding business transactions may have been correspondingly affected for those applications/processes (e.g., online purchases were delayed, page visits were halted before fully loading, user satisfaction or dwell time decreased, etc.), while other processes (e.g., on other network segments or at other times) remain unaffected. The techniques herein, therefore, can correlate the software agents' performance with various business transactions in order to better understand the effect on the business transactions, accordingly.

Illustratively, the techniques described herein may be performed by hardware, software, and/or firmware, such as in accordance with the illustrative agent profiler process 248, which may include computer executable instructions executed by the processor 220 to perform functions relating to the techniques described herein, e.g., in conjunction with corresponding processes of other devices in the computer network as described herein (e.g., on network agents, controllers, computing devices, servers, etc.).

According to the embodiments herein, a method herein may comprise: attaching, by a software agent profiler process, to an application and a primary instrumentation interface for the application; discovering, by the software agent profiler process, one or more software agents associated with the application; launching, by the software agent profiler process, the one or more software agents within an encapsulated container environment of the software agent profiler process by configuring each of the one or more software agents, respectively, to point to a proxy instrumentation interface of the software agent profiler process instead of the primary instrumentation interface for the application; receiving, by the software agent profiler process, calls from the one or more software agents on the proxy instrumentation interface of the software agent profiler process; and managing, by the software agent profiler process, the calls from the one or more application agents prior to the calls being passed to the primary instrumentation interface for the application.

In one embodiment, attaching comprises: performing a javaagent switch operation. In one embodiment, discovering comprises: reading a configuration file of the application. In one embodiment, the one or more software agents comprise Java agents. In one embodiment, managing comprises: determining whether to pass the call to the primary instrumentation interface for the application or to block the call from passing to the primary instrumentation interface for the application. In one embodiment, managing comprises: auditing the one or more software agents based on the calls. In one embodiment, managing comprises: mitigating conflicts between a plurality of software agents of the one or more software agents. In one embodiment, the method further comprises: monitoring resource usage based on receiving the calls. In one embodiment, the method further comprises: determining whether to launch particular software agents of the one or more software agents. In one embodiment, the method further comprises: generating test conditions using artificial calls to the primary instrumentation interface for the application. In one embodiment, the method further comprises: monitoring the one or more software agents for hyperactivity based on the calls; and mitigating detected hyperactivity. In one embodiment, the method further comprises: recording and reporting class changes made within the calls. In one embodiment, the method further comprises: monitoring the one or more software agents for latency times based on the calls; and mitigating detected high latency. In one embodiment, the method further comprises: performing a stack sampler operation on threads of the one or more software agents, wherein the stack sampler operation is filtered to monitor only specific threads that are active transaction-based threads.

According to the embodiments herein, a tangible, non-transitory, computer-readable medium herein may have computer-executable instructions stored thereon that, when executed by a processor on a computer, may cause the computer to perform a method comprising: attaching a software agent profiler process to an application and a primary instrumentation interface for the application; discovering one or more software agents associated with the application; launching the one or more software agents within an encapsulated container environment of the software agent profiler process by configuring each of the one or more software agents, respectively, to point to a proxy instrumentation interface of the software agent profiler process instead of the primary instrumentation interface for the application; receiving calls from the one or more software agents on the proxy instrumentation interface of the software agent profiler process; and managing the calls from the one or more application agents prior to the calls being passed to the primary instrumentation interface for the application.

Further, according to the embodiments herein an apparatus herein may comprise: one or more network interfaces to communicate with a network; a processor coupled to the network interfaces and configured to execute one or more processes; and a memory configured to store a process executable by the processor, the process, when executed, configured to: attach a software agent profiler process to an application and a primary instrumentation interface for the application; discover one or more software agents associated with the application; launch the one or more software agents within an encapsulated container environment of the software agent profiler process by configuring each of the one or more software agents, respectively, to point to a proxy instrumentation interface of the software agent profiler process instead of the primary instrumentation interface for the application; receive calls from the one or more software agents on the proxy instrumentation interface of the software agent profiler process; and manage the calls from the one or more application agents prior to the calls being passed to the primary instrumentation interface for the application.

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as Java, TCP, IP, and so on, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments of particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a server" or "by a controller", those skilled in the art will appreciate that agents of the application intelligence platform (e.g., application agents, network agents, language agents, etc.) may be considered to be extensions of the server (or controller) operation, and as such, any process step performed "by a server" need not be limited to local processing on a specific server device, unless otherwise specifically noted as such. Furthermore, while certain aspects are described as being performed "by an agent" or by particular types of agents (e.g., application agents, network agents, etc.), the techniques may be generally applied to any suitable software/hardware configuration (libraries, modules, etc.) as part of an apparatus or otherwise.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
   attaching, by a software agent profiler process, to an application and a primary instrumentation interface for the application;
   discovering, by the software agent profiler process, one or more software agents associated with the application;
   launching, by the software agent profiler process, the one or more software agents within an encapsulated container environment of the software agent profiler process by configuring each of the one or more software agents, respectively, to point to a proxy instrumentation interface of the software agent profiler process instead of the primary instrumentation interface for the application;
   receiving, by the software agent profiler process, calls from the one or more software agents on the proxy instrumentation interface of the software agent profiler process; and
   managing, by the software agent profiler process, the calls from the one or more application agents prior to the calls being passed to the primary instrumentation interface for the application.

2. The method as in claim 1, wherein attaching comprises:
   performing a javaagent switch operation.

3. The method as in claim 1, wherein discovering comprises:
   reading a configuration file of the application.

4. The method as in claim 1, wherein the one or more software agents comprise Java agents.

5. The method as in claim 1, wherein managing comprises:
   determining whether to pass the call to the primary instrumentation interface for the application or to block the call from passing to the primary instrumentation interface for the application.

6. The method as in claim 1, wherein managing comprises:
   auditing the one or more software agents based on the calls.

7. The method as in claim 1, wherein managing comprises:
   mitigating conflicts between a plurality of software agents of the one or more software agents.

8. The method as in claim 1, further comprising:
   monitoring resource usage based on receiving the calls.

9. The method as in claim 1, further comprising:
   determining whether to launch particular software agents of the one or more software agents.

10. The method as in claim 1, further comprising:
    generating test conditions using artificial calls to the primary instrumentation interface for the application.

11. The method as in claim 1, further comprising:
    monitoring the one or more software agents for hyperactivity based on the calls; and
    mitigating detected hyperactivity.

12. The method as in claim 1, further comprising:
    recording and reporting class changes made within the calls.

13. The method as in claim 1, further comprising:
    monitoring the one or more software agents for latency times based on the calls; and
    mitigating detected high latency.

14. The method as in claim 1, further comprising:
    performing a stack sampler operation on threads of the one or more software agents, wherein the stack sampler operation is filtered to monitor only specific threads that are active transaction-based threads.

15. A tangible, non-transitory, computer-readable medium having computer-executable instructions stored thereon that, when executed by a processor on a computer, cause the computer to perform a method comprising:
    attaching a software agent profiler process to an application and a primary instrumentation interface for the application;
    discovering one or more software agents associated with the application;
    launching the one or more software agents within an encapsulated container environment of the software agent profiler process by configuring each of the one or more software agents, respectively, to point to a proxy instrumentation interface of the software agent profiler process instead of the primary instrumentation interface for the application;
    receiving calls from the one or more software agents on the proxy instrumentation interface of the software agent profiler process; and
    managing the calls from the one or more application agents prior to the calls being passed to the primary instrumentation interface for the application.

16. The computer-readable medium as in claim 15, wherein the method, for managing, further comprises:
    determining whether to pass the call to the primary instrumentation interface for the application or to block the call from passing to the primary instrumentation interface for the application.

17. The computer-readable medium as in claim 15, wherein the method, for managing, further comprises:
    mitigating conflicts between a plurality of software agents of the one or more software agents.

18. The computer-readable medium as in claim 15, wherein the method further comprises:
    generating test conditions using artificial calls to the primary instrumentation interface for the application.

19. The computer-readable medium as in claim 15, wherein the method further comprises:
    performing a stack sampler operation on threads of the one or more software agents, wherein the stack sampler operation is filtered to monitor only specific threads that are active transaction-based threads.

20. An apparatus, comprising:
    one or more network interfaces to communicate with a network;
    a processor coupled to the network interfaces and configured to execute one or more processes; and
    a memory configured to store a process executable by the processor, the process, when executed, configured to:
        attach a software agent profiler process to an application and a primary instrumentation interface for the application;
        discover one or more software agents associated with the application;
        launch the one or more software agents within an encapsulated container environment of the software agent profiler process by configuring each of the one or more software agents, respectively, to point to a proxy instrumentation interface of the software agent profiler process instead of the primary instrumentation interface for the application;
        receive calls from the one or more software agents on the proxy instrumentation interface of the software agent profiler process; and
        manage the calls from the one or more application agents prior to the calls being passed to the primary instrumentation interface for the application.

\* \* \* \* \*